United States Patent Office 3,008,851
Patented Nov. 14, 1961

3,008,851
NOVEL QUATERNARY AMMONIUM COMPOUNDS AND METHODS OF PRODUCING THEM
Ruth H. Zeitschel Shimizu, Chigasaki City, Japan, and Sidney Melamed, Philadelphia, Pa., assignors to Rohm & Haas Company, Philadelphia, Pa., a corporation of Delaware
No Drawing. Filed Mar. 21, 1955, Ser. No. 495,784
16 Claims. (Cl. 117—138.8)

This invention relates to new monomeric and polymeric quaternary ammonium compounds and to their production. It is particularly concerned with the production of monomers and polymers, either homopolymers or copolymers, comprising units containing in a branch thereof quaternary ammonium nitrogen to which is attached a radical containing carbonamido or ureido groups, which polymers are water-soluble or readily water-dispersible but by virtue of the amido or ureido groups are convertible to an insoluble condition.

Such polymers have a wide variety of uses as will be pointed out more particularly hereinafter. They are particularly useful as adjuvants to paper for imparting increased wet strength and as agents for impregnating or coating textiles for various purposes. Because of the fact that they are readily converted to insoluble condition after incorporation in the paper or textile, they may be rendered resistant to removal therefrom during subsequent wetting, washing or scouring operations.

The polymeric compounds of the present invention are water-soluble or easily water-dispersible addition polymers of monoethylenically unsaturated monomers comprising at least 5 mole percent, and preferably at least 30 mole percent, of at least one monomer of the present invention having the structure of Formula I:

I
$$CH_2=CR \quad R' \quad R^2$$
$$Y-A-N$$
$$X \quad R^3$$

where R is hydrogen or methyl,
Y is O, —CONR—, —COO—,
A is a straight-chain or branched-chain alkylene group having 2 to 10 carbon atoms which may be substituted by one or more hydroxyl groups, at least two of the carbon atoms thereof being connected in a chain between the N atom and Y group of the formula,
R' and $R^2$ may be (1) separate groups selected individually from the group consisting of saturated and ethylenically unsaturated hydrocarbon groups of 1 to 4 carbon atoms, and (2) a single group selected from the morpholino residue :$(C_2H_4)_2O$, the pyrrolidino residue —$C_4H_8$—, the piperidino residue —$C_5H_{10}$—, and an N-alkyl piperazino residue :$(C_2H_4)_2$:$NR^4$ where $R^4$ is an alkyl group of 1 to 18 carbon atoms, such as methyl, ethyl, isopropyl,
X is a halogen, preferably chlorine, and
$R^3$ is selected from radicals having the structure of one of Formulas II and III following.

II      —$CH_2(CONH)_mR°$

III
$$-CH_2(CONHCH_2)_{p-1}(CH_2)_{n-1}-Z-N \begin{smallmatrix} C \\ \| \\ O \end{smallmatrix} NR°$$
$$H_2C \quad CH_2$$
$$(C \atop H_2)_{n-1}$$

wherein m is an integer having a value of 1 to 2,
R° is selected from H, —$CH_2OH$, and —$CH_2OR^5$ where $R^5$ is an alkyl group having from 1 to 4 carbon atoms,
p is an integer having a value of 1 to 2, n is an integer having a value of 1 to 2 when p is 2 but having only a value of 1 when p is 1, and
Z is selected from $$-\overset{O}{\underset{\|}{C}}-$$

and —$CH_2$— when p is 1, but is only $CH_2$ when p is 2.
Thus, $R^3$ may have the structures of the following Formulas IV, V, VI, VII, VIII, and IX:

IV        —$CH_2CONHR°$ where m is 1;

V         —$CH_2CONHCONHR°$ where m is 2;

VI
$$-CH_2CO-N \begin{smallmatrix} C \\ \| \\ O \end{smallmatrix} NR°$$
$$H_2C---CH_2$$

when n is 1, p is 1, and Z is $$-\overset{O}{\underset{\|}{C}}-$$

VII
$$-CH_2CH_2-N \begin{smallmatrix} C \\ \| \\ O \end{smallmatrix} NR°$$
$$H_2C---CH_2$$

when n is 1, p is 1, and Z is —$CH_2$—;

VIII
$$-CH_2CONHCH_2CH_2N \begin{smallmatrix} C \\ \| \\ O \end{smallmatrix} NR°$$
$$H_2C---CH_2$$

when n is 1, p is 2, and Z is —$CH_2$—;

IX
$$-CH_2CONH(CH_2)_3N \begin{smallmatrix} C \\ \| \\ O \end{smallmatrix} NR°$$
$$H_2C \quad CH_2$$
$$\underset{H_2}{C}$$

when n is 2, p is 2, and Z is —$CH_2$—.

An essential characteristic of the polymers of the invention is their capability of being cured to an insoluble condition and this is attributable to the R° substituent. When R° is H, formaldehyde may be reacted with the polymer to produce the corresponding methylol derivative, or, when a lower alcohol is also present, the corresponding alkoxymethyl (—$CH_2OR^5$) derivative, either of which are convertible to an insoluble condition on heating in the presence of an acidic catalyst.

The polymers may contain up to 70% by weight of one or more other comonomers such as acrylonitrile, the vinyl aromatic compounds, more particularly the vinyl aromatic hydrocarbons (e.g., styrene, isopropenyl toluene, the various dialkyl styrenes, etc.), other aliphatic compounds containing a $CH_2=C=$ grouping, e.g. the various substituted acrylonitriles (e.g., methacrylonitrile, ethacrylonitrile, phenylacrylonitrile, etc.), acrylamide and the various substituted acrylamides (e.g., methacrylamide, ethacrylamide, the various N-substituted acrylamides which are different from those used in practicing the present invention and the various N-substituted alkacrylamides, for instance N-methylol acrylamide, N-monoalkyl and -dialkyl acrylamides and methacrylamides, e.g., N-monomethyl, -ethyl, -propyl, -butyl, etc. and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, etc., esters of an acrylic acid (including acrylic acid itself and the various α-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec-butyl, tert-butyl, amyl, hexyl, heptyl, octyl, decyl, dodecyl, etc. esters of acrylic, methacrylic, ethacrylic, phenylacrylic, etc. acids, vinyl ethers, such as butyl vinyl ether, N-vinyl compounds such as N-vinyl pyrrolidone, and olefins, such as ethylene, fluorinated vinyl compounds, such as vinylidene fluoride, as well as other vinyl aromatic and vinyl aliphatic compounds, and other compounds containing a single $CH_2=C=$ grouping.

If the polymer contains less than 30 mole percent of quaternary nitrogen containing units of Formula I, it preferably contains enough additional quaternary nitrogen containing units of other types to provide a total of at least 30 mole percent of quaternary nitrogen containing groups. Examples of other such units are those having the structure of Formula I$a$:

Ia 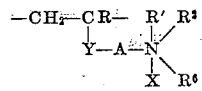

where the symbols have the same definition as before and $R^6$ may be benzyl, cyclohexyl, or an alkyl group having 1 to 4 carbon atoms.

Those polymers of the invention in which the $R'$ and $R^2$ groups are saturated may be made by first polymerizing or copolymerizing an amine having the structure of Formula X:

X $\quad CH_2=C(R)YANR^7R^8$ 

where R, Y, and A are the same as defined above and $R^7$ and $R^8$ may be (1) separate groups selected individually from the group consisting of saturated hydrocarbon groups of 1 to 4 carbon atoms, and (2) a single group selected from the morpholino residue :$(C_2H_4)_2O$, the pyrrolidino residue —$C_4H_8$—, the piperidino residue —$C_5H_{10}$—, and an N-alkyl piperazino residue

:$(C_2H_4)_2$:$NR^4$ where $R^4$ is an alkyl group of 1 to 18 carbon atoms, such as methyl, ethyl, isopropyl. Then in the polymer thereby obtained part or all of the tertiary nitrogen groups are quaternized by means of an alkylating agent of the Formula $R^3$, with or without an alkylating agent $R^6X$, to provide at least 30% by weight of quaternized monomeric units in the polymer including at least 5 mole percent of units having the Formula I.

An alternate procedure to produce the polymers of the present invention in which $R'$ and $R^2$ are saturated is to quaternize corresponding monomers of Formula X with $R^3X$, with or without $R^6X$, or one of such monomers with $R^3X$ and another with $R^6X$, and then to polymerize or copolymerize the quaternary ammonium compounds obtained which have the structure of Formulas X$a$ and X$b$:

Xa 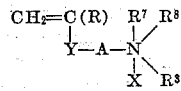

Xb 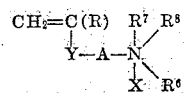

where the symbols have the same definitions as before.

Any known procedure for polymerizing the compounds may be employed either for polymerizing the amine or amines before quaternization or for polymerizing the quaternized monomer or monomers. For example, various free radical catalysts may be used such as hydrogen peroxide, organic peroxide, such as butyl perbenzoate or benzyl peroxide or azo catalysts such as azodiisobutyronitrile. Such catalysts may be employed for polymerization in bulk or in solution. On the other hand, if polymerization is to be effected in emulsions or dispersions of the monomers, ammonium persulfate or alkali metal persulfates may be employed. Polymerization may be effected at 60° to 100° C. and the amount of catalyst or initiator may be from 0.1% to about 20% by weight of the monomer or monomers. Polymerization may be carried out in an inert atmosphere such as nitrogen.

The quaternization of the monomer or monomers, or of the polymer is preferably effected in a polar solvent such as water, ethanol, acetonitrile, dimethylformamide, or glycol ethers such as ethoxyethyl hydroxyethyl ether or mixtures of one of these solvents with benzene or toluene at a temperature of 60° C. to 100° C. for a period of about two to twelve hours. The alkylating agent $R^3X$ may be used in a quantity that is molarly equivalent to the total number of amine groups in the polymer to quaternize all of such groups. However, when there is more than 5 mole percent of the monomeric units containing a quaternizable amine group, it is unnecessary to quaternize all of such amine groups and the amount of quaternizing agent may be less than the amount required to quaternize all of the amine groups in the polymer provided sufficient is used to provide 5 mole percent of quaternized monomeric units having the structure of Formula I in the final polymer.

The molecular weight of the final quaternized polymer is not critical. It may vary from as few as 10 monomeric units to a molecular weight of the order of 500,000 or more.

One procedure for producing polymers containing units of the formula

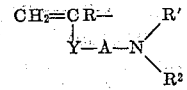

(where R, A, $R'$, and $R^2$ are as defined above and Y is —CONR—) and adapted to be quaternized as described above to produce the polymers of the invention is to aminolyze polymers of an ester of acrylic or methacrylic acid, preferably poly(methyl acrylate) or a copolymer of at least 5 mole percent, and preferably at least 30 mole percent of methyl acrylate, by means of at least one amine of Formula XI:

XI $\quad HNRANR'R^2$ 

where the symbols are the same as defined above. Generally, aminolysis is performed in a medium which is anhydrous or contains but little water unless considerable carboxyl groups are desired in the final polymeric product. The amine or amine mixture itself may serve as the solvent as well as the reactant for aminolyzing the polymerized methyl acrylate and aminolysis may be effected at temperatures of 90° to 130° C. in a time of 96 hours to 24 hours respectively, the time required generally being inversely proportional to the temperature. In the presence of a 3-to-4-fold excess of amine, complete aminolysis may be effected in the times and the temperatures just mentioned, and it has been found that the higher the temperature employed, the higher is the final molecular weight of polymer obtained. A catalyst to accelerate the reaction is unnecessary but an alkoxide such as sodium methoxide, sodium ethoxide, or the like, may be used in amounts of from ½% to 20% by weight of the polymer. With a catalyst, an amount of the amine or amine mixture equivalent to the ester groups to be aminolyzed may be dissolved in a solvent such as toluene or additional amine, either the same or different, or an alcohol, such as methanol, ethanol, or butanol, and the complete aminolysis may be obtained in eight hours at a temperature of 80° to 90° C. An advantageous system is to start in toluene in which the polymerized ester is soluble and during the reaction to add an alcohol such as methanol, ethanol, or butanol in which the aminolyzed polymer is soluble, and subsequently to remove the solvent to obtain the final polymer.

The polymeric esters of alcohols other than methyl, such as of ethyl alcohol, propyl alcohol, butyl alcohol, and so on, require an increase in the time and temperature factor to produce a corresponding conversion of ester groups to amido groups in the polymer. Generally, when an amine used contains a primary nitrogen atom, it is necessary to maintain the reaction medium containing the polymeric ester and amine at a temperature below 130° C. in order to avoid imide formation with consequent cross-linking and insolubilization of the final polymer. However, when the aminolysis is effected by amines containing secondary nitrogen atoms but no primary nitrogen atom, there is no possibility of cross-linking or imide formation so that higher temperatures may be used up to 180° to 200° C.

Polymerized esters of the unsaturated acids in which the α-carbon atom is substituted by an alkyl group, such as methyl, ethyl, propyl, or isopropyl, of which methyl methacrylate, methyl ethylacrylate and methyl propylacrylate are typical, are more difficult to aminolyze and when an amine containing a primary nitrogen atom is used, it is difficult to get aminolysis of 60% to 100% of the ester groups without cross-linking. Generally, however, the aminolysis may be effected at temperatures of 180° to 200° C. for three to seven hours with production of uncross-linked products which are up to 60% aminolyzed. Generally to get a larger proportion of the ester groups or all thereof in the polymer aminolyzed, a 5-to-10-fold excess of amine may be reacted at a temperature of 130° C. for a time of from four to seven days. Alternatively, an alkoxide catalyst may be used with 2-to-4-fold excess amine or an amount of amine equivalent to the ester groups to be aminolyzed may be used at 130° C.

As the alkyl substituent on the α-carbon of the acrylic acid increases in size, more drastic conditions are generally required. Similarly, as the alkyl group of the ester increases in size, more drastic conditions are necessary to effect aminolysis; thus, when polymerized methyl methacrylate is replaced with polymerized ethyl methacrylate, longer times and higher temperature must be used. As already stated, imide formation may be prevented by the use of amines which contain a secondary nitrogen atom but no primary nitrogen atom.

The difference in reactivity of these various esters makes it possible to obtain for all practical purposes a selective aminolysis of copolymers containing different ester units. For example, when the final quaternary ammonium compound desired to be produced is one containing methyl methacrylate as comonomer units, a copolymer of methyl methacrylate with at least 5 mole percent of methyl acrylate may serve as a starting material so that aminolysis converts the ester groups of the methyl acrylate units to amide units without affecting the ester units of the methyl methacrylate to any considerable extent. Such an aminolysis, for example, may be effected at 80° to 120° C. in the presence of an amount of an amine mixture which is equivalent to the ester groups in the methyl acrylate portion of the copolymer. Similarly, if it is desired to produce a copolymer containing quaternary ammonium groups with one or more comonomers of non-ester type listed hereinabove such as of styrene, a corresponding copolymer, as of styrene and methyl acrylate, may be used as the starting material in which the proportion of acrylate units corresponds to the number of acrylamide units desired and all such acrylate units may be converted to amide groups in the aminolysis.

To produce polymers of Formula I in which $R^3$ has the specific structure of Formula IV, α-chloroacetamide, or its methylol or alkoxymethyl derivatives may be used to quaternize an amine of Formula X.

To produce polymers of Formula I in which $R^3$ has the specific structure of Formula V, an amine of Formula X is quaternized by an alkylating agent obtained by reacting α-chloroacetyl chloride with urea as described in J.A.C.S., vol. 61, p. 1377. The resulting α-chloroacetylurea may be reacted with formaldehyde, with or without a lower alcohol, to produce the corresponding methylol or alkoxymethyl derivative before using it to quaternize the amine.

To produce polymers of Formula I in which $R^3$ has the specific structure of Formula VI, an amine of Formula X is quaternized by N-(α-chloroacetyl)-N,N'-ethyleneurea prepared by reacting α-chloroacetyl chloride with N,N'-ethyleneurea at 60° to 80° C. in toluene. The quaternizing agent thus prepared, may, if desired, be reacted with formaldehyde, with or without a lower alcohol, to produce the corresponding methylol or alkoxymethyl derivative before using it to quaternize the amine.

To produce polymers of Formula I in which $R^3$ has the specific structure of Formula VII, an amine of Formula X is quaternized by the N-(β-chloroethyl)-N,N'-ethyleneurea obtained by reacting thionyl chloride ($SOCl_2$) with N-(β-hydroxyethyl)-N,N'-ethyleneurea. The quaternizing agent thus prepared may, if desired, be reacted with formaldehyde, with or without a lower alcohol, to produce the corresponding methylol or alkoxymethyl derivative before using it to quaternize the amine.

To produce polymers of Formula I in which $R^3$ has the specific structure of Formula VIII, an amine of Formula X is quaternized by the N-[β-(α-chloroacetamido)-ethyl]-N,N'-ethyleneurea obtained by reacting methyl α-chloroacetate with N-(β-aminoethyl)-N,N'-ethyleneurea. The quaternizing agent thus prepared may, if desired, be reacted with formaldehyde, with or without a lower alcohol, to produce the corresponding methylol or alkoxymethyl derivative before using it to quaternize the amine.

To produce polymers of Formula I in which $R^3$ has the specific structure of Formula IX, an amine of Formula X is quaternized by the N-[3-(α-chloroacetamido)-propyl]-N,N'-trimethyleneurea obtained by reacting methyl α-chloroacetate with N-(3-aminopropyl)-N,N'-trimethyleneurea. The quaternizing agent thus prepared may, if desired, be reacted with formaldehyde, with or without a lower alcohol, to produce the corresponding methylol or alkoxymethyl derivative before using it to quaternize the amine.

The new compounds are viscous to solid resinous materials of water-soluble character or at least readily water-dispersible character. They are generally also soluble in organic solvents of polar type, such as alcohols, especially the lower alcohols, methanol, ethanol, propanol, isopropanol and the butyl alcohols, and also in acetonitrile, dimethylformamide and so on. When the polymers are free of units containing carboxyl or free amine groups, they are generally substantially neutral. The polymeric compounds of the present invention can be isolated by any of numerous conventional procedures, such as by freeze-drying, evaporation of solvents from the reaction mixtures containing them, or the like. Those polymeric compounds in which $R^\circ$ is hydrogen are quite stable under normal storage conditions but are capable of reacting with formaldehyde as well as other aldehydes, protein, enzymes, and polyacids. Thus, the polymers may serve as precipitants for proteins and enzymes and may be reacted with polycarboxylic acids to form gels which are revertible to sols on change of pH. Reaction with formaldehyde in an aqueous medium may be effected readily on the alkaline side between pH of 8 and 9 when the substituent $R^3$ contains a ureido group and from a pH of 9 to 10 when the radical $R^3$ comprises a simple amide linkage. The reaction is generally carried out in the presence of 1 to 3 moles of formaldehyde per amide or ureido group, an alkali metal hydroxide being employed to provide the necessary pH value. The reaction may be effected in the presence of a lower alcohol, to provide the alkoxymethyl derivative, at a temperature of 60° to 80° C. for one-half to two hours. Alkoxymethylation may be effected in two stages wherein the first stage is carried out under alkaline conditions at the pH mentioned above and the second stage is effected under acid conditions at a pH between 3 and 4.

The alkoxymethylated derivatives are preferable to the simple methylolated derivatives in that the former are more stable under normal conditions of storage.

Those compounds in which R° is hydrogen are useful as bactericides, fungicides, and insecticides. They are particularly valuable as bactericidal fungicides which are effective in hard water. They may be used as additives to film-forming solutions adapted to be spun or extruded into films, sheets or fibers, such as those of cellulose acetate, polyvinyl alcohol, polyvinyl pyrrolidone, nylon, or acrylonitrile polymers for the purpose of modifying the properties of the product especially their moisture-regain properties, their feel or handle, their solubility, and their affinity for dyes. After the extrusion or spinning of such films or fibers, the drying stage could include or be followed by a treatment with formaldehyde, glyoxal or other aldehyde with an acid catalyst such as ammonium chloride and baking or curing operation to convert the polymer to an insoluble permanent condition. They are useful as dispersants when they have low molecular weights such as from 1000 to 5000. They are also useful as flocculants for suspended matter in water purification and the concentration of ores or the like when they have molecular weights of 50,000 or higher, preferably at least 100,000. They may be applied to textiles for various purposes. When they comprise a substantial hydrophobic component as in the radical A or in the comonomers when copolymers are used, they may serve as water-repellent or water-proofing coating compositions. Those which do not comprise a markedly high hydrophobic component may be applied as antistatic agents to hydrophobic textiles such as those comprising fibers, filaments or yarns of cellulose esters, such as cellulose acetate, polyesters such as polyethylene terephthalate (Dacron) and vinyl polymers, such as those containing 75% to 95% of vinyl chloride, acrylonitrile, or the like (including the acrylonitrile copolymers now available under the tradenames Orlon and Acrilan). They may also be incorporated in paper, for example as a beater additive, for imparting high wet strength or other desirable properties to the paper. They may be applied to leather and other substrates for various purposes including water-repellency, prevention of the development of static electricity and the like. In all of such applications, they may be employed either as temporary conditioning agents or they may be converted into durable finishes by reaction with formaldehyde or other reactive material including other types of aldehydes to convert them to insoluble condition through the agency of the carbonamido or ureido group in the radical $R^3$ of the compounds. When so reacted with the aid of an acidic catalyst with or without elevated temperatures, the polymeric compounds of the present invention become permanently affixed to the substrate and resist removal during subsequent operations of washing, scouring, and in many cases dry-cleaning. It is believed that in the case of certain types of substrates, particularly the cellulosic types and the proteinous types, such as rayon or wool respectively, there is also reaction between the substrate, the polymer and the other reactants such as formaldehyde, but it is not intended to be limited to any particular theory of operation therein.

Those polymers in which the group R° is methylol or alkoxymethyl, such as methoxymethyl, already contain a reactive element adapting them to be converted into durable components of any system to which they are applied. Thus, these readily water-dispersible polymeric compounds are easily applied through aqueous or alcoholic media to various substrates including those of paper, leather, textiles or the like and are adapted to be converted to insoluble condition merely by heating preferably in the presence of an acidic catalyst which may be incorporated onto the substrate at the same time as it is impregnated with the polymeric compounds of the present invention. Thus, substrates of wool, cellulose, rayon, Cellophane, cotton, cellulose esters, such as cellulose acetate or cellulose acetate butyrate, polyvinyl alcohols, polyamides of the nylon type, homopolymers or copolymers of acrylamide or methacrylamide, may be impregnated or coated with solutions of the polymers of the present invention in which the group R° is a methylol or an alkoxymethyl group and a small amount, from ½% to 2%, on the weight of the compound of the present invention, of an acidic catalyst and after drying, the treated substrate may be subjected to baking or curing operations in which the polymer applied is converted to an insoluble condition which may or may not involve reaction with the substrate as well. As an acidic catalyst there may be used hydrochloric acid, sulfuric acid, phosphoric acid, oxalic acid, ammonium phosphate, ammonium thiocyanate, hydrochloric or other acid salts of a hydroxy aliphatic amine including 2-methyl-2-amino-1-propanol, 2-methyl-2-amino-1,3-propandiol, tris(hydroxymethyl)-aminomethane, 2-phenyl-2-amino-1-propanol, 2-methyl-2-amino-1-pentanol, 2-aminobutanol, triethanolamine, 2-amino-2-ethyl-1-butanol, also ammonium chloride, pyridine hydrochloride, benzyl dimethylamine oxalate.

Thus, the compounds may be applied to hydrophobic textile materials of the types mentioned above in an amount of 2% to 10% on the weight of the textile material to provide an antistatic finish which can be converted to insoluble condition by drying and baking or curing at a temperature of 240° to 450° F. for periods of time which are inversely proportional to the temperature, such as for a period of about 30 minutes at 240° F., about 10 minutes at 300° F., and 15 to 30 seconds at 450° F. When the polymers comprise a hydrophobic component, they may be applied in aqueous solution to a textile, leather or the like, and after curing they may serve to impart water-repellency or water-proofing characteristics depending upon the extent of hydrophobicity of the polymer. The compounds may be applied to hydrophilic material, such as cotton and wool to modify the physical and chemical properties thereof, either in the form of yarns or fabrics. Thus, they may modify the feel, generally improving the softness thereof; the dyeability, generally increasing the affinity of the textile to certain types of dyes; or they may be applied to impart improved dimensional stability and resistance to shrinkage on washing of the fabrics, or to increase the resistance to creasing.

For the application to textiles, the compounds of the present invention may be combined with auxiliary agents, such as those of aminoplast types, particularly the water-soluble urea-formaldehyde, triazine-formaldehyde, such as melamine-formaldehyde, heat-convertible condensates, especially where increased stiffness or resistance to creasing is desired.

In the following examples, which are illustrative of the present invention, the parts and percentages are by weight unless otherwise specified:

Example 1

(a) A solution of 120 grams (1.1 moles) of methyl chloroacetate in 300 ml. of methanol is treated slowly with stirring at 0° C. with 129 grams (1.0 mole) of N-(2-aminoethyl)-N,N'-ethyleneurea. The mixture is allowed to stir for 4 hours after the addition is completed. The product, N-(2-[α-chloroacetamido]ethyl)-N,N'-ethyleneurea, is isolated by removing solvent at reduced pressure. It is purified by recrystallization to give a white, crystalline solid, M.P. 125° to 127° C. It contains 20.2% nitrogen and 17.2% chlorine by analysis which agrees with the calculated values of 20.2 and 17.3 respectively.

(b) A solution containing 32.8 grams (0.2 mole) of a polymeric N-[3-(dimethylamino)propyl]acrylamide of equivalent weight 164 obtained by aminolysis of poly-(methyl acrylate), 46.2 grams (0.2 mole) of N-(2-[α-chloroacetamido]ethyl)-N,N'-ethyleneurea and 134 grams of methanol is heated at reflux for 6 hours. The resultant product is filtered and contained 36.2% solids, 3.3% titratable chlorine, and 6.3% nitrogen. Calculated values are 3.3% chlorine and 6.42% nitrogen.

The compound is a homopolymer comprising units having the structure of Formula XII:

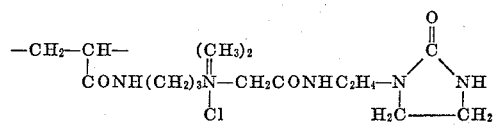

Example 2

A mixture of 182 grams of the solution obtained after the 6 hours of refluxing in Example 1 and 37.5 grams of a 55% solution of formaldehyde in methanol is adjusted to pH 8.5 with sodium methoxide and heated at 65° C. for 2 hours. The pH is then adjusted to 4.0 with phosphoric acid and heated at reflux for one hour. The pH is adjusted to 7.0 with sodium methoxide and the reaction mass is filtered to clarify. The resultant solution contains 24.6% solids, essentially the poly(methoxymethyl) derivative of the polyquaternary obtained in Example 1.

Example 3

A mixture of 115 grams of poly(β-dimethylaminoethyl vinyl ether), 300 ml. of methanol and 140 grams (a molar equivalent) of N-methoxymethyl-α-chloroacetamide is heated at reflux for 6 hours. The product is a polymer comprising units having the structure of Formula XIII:

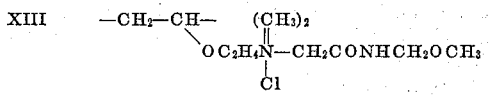

Example 4

The product obtained in Example 3 is diluted with water to give a solution containing 5% of active polymeric material and 0.5% by weight of solution of ammonium chloride is added. A nylon fabric is padded through so as to retain about 35% of the quaternary in solution. The fabric is air-dried and cured for 10 minutes at 300° F. The fabric is effectively protected against the development of static charge and retains this protection after five full soap wash cycles in a launderometer. This treatment is similarly employed and effective with polyester (polyethylene terephthalate), polyacrylonitrile and cellulose acetate fabrics in conferring antistatic properties thereto.

Example 5

(a) One mole of methyl α-chloroacetate is reacted with one mole of N-(3-aminopropyl)-N,N'-trimethyleneurea, which may also be called N-(3-aminopropyl)-hexahydropyridimidone-2, by the procedure of Example 1(a). The product isolated, N-[3-(α-chloroacetamido)propyl]-hexahydropyrimidone-2, is a white, crystalline solid.

(b) To a solution of a copolymer of 30 mole percent of β-dimethylaminoethyl methacrylate with 70 mole percent of ethyl acrylate in 270 grams of methanol containing 0.4 gram mole equivalent of the amine, 0.4 gram mole of the product of part (a) hereof is added and the mixture is heated at reflux for 7 hours, thereby producing a solution of a polymer containing 70 mole percent of ethyl acrylate units and 30 mole percent of units having the structure of Formula XIV:

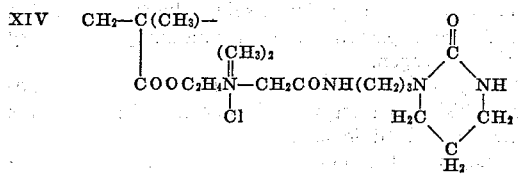

(c) With 180 grams of the solution obtained after reflux in part (b) hereof there is mixed 37.5 grams of a 55% solution of formaldehyde in methanol, the pH is adjusted to 8.5 with sodium methoxide, and then the mass is heated at 70° C. for 1 hour. The pH is adjusted to 3.5 with phosphoric acid and heated at reflux for 1 hour. The pH is adjusted to 7 with sodium methoxide and the reaction mass is filtered to clarify it. The product is a solution containing the poly(methoxymethyl) derivative of the polyquaternary nitrogen compound of part (b) hereof.

Example 6

The product obtained in Example 5(c) is diluted with water to give a solution containing 5% of active polymeric material and 0.5% by weight of a solution of ammonium chloride is added. A nylon fabric is padded through so as to retain about 35% of the quaternary in solution. The fabric is air-dried and cured for 10 minutes at 300° F. The fabric is effectively protected against the development of static charge and retains this protection after five full soap wash cycles in a launderometer. This treatment is similarly employed and effective with polyester, polyacrylonitrile and cellulose acetate fabrics in conferring antistatic properties thereto.

Example 7

(a) One mole of N-(β-[α-chloroacetamido]ethyl)-N,N'-ethyleneurea is dissolved in 300 ml. of a 30% solution of formaldehyde in methanol adjusted to a pH of 8.0 with sodium hydroxide. The resultant solution is heated at 55° to 60° C. for 30 minutes. About 90% of the initial cyclic urea is converted to the methylol derivative as measured by titration with sodium sulfite at 0 to 5°.

(b) To the solution obtained in part (a) there is added a copolymer of 95 mole percent of vinyl pyrrolidone with 5 mole percent of 2-dimethylaminooctyl acrylate and the mixture is heated at reflux for 6 hours. The product is a copolymer of 95 mole percent of vinyl pyrrolidone with 5 mole percent of units having the structure of Formula XV:

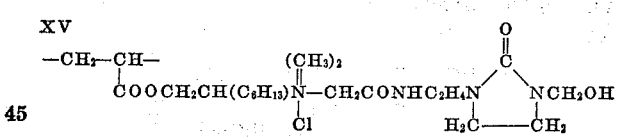

Example 8

(a) A mixture of 5 gram moles of β-dimethylaminoethyl acrylate and 5 gram moles of N-(α-chloroacetyl)-N,N'-ethyleneurea in 2.5 liters of methanol is heated at reflux for 7 hours and the methanol is then evaporated to leave the dry quaternary compound.

(b) A mixture of 25 gram moles of β-dimethylaminoethyl acrylate and 25 gram moles of benzyl chloride in 5 liters of methanol is heated at reflux for 10 hours and the methanol is evaporated to leave the quaternary compound.

(c) The 5 gram moles of the quaternary of part (a) is mixed with the 25 gram moles of the quaternary of part (b) and with 70 gram moles of n-butyl acrylate. About 2%, on the total weight of these monomers, of azodiisobutyronitrile is added and copolymerization is effected by heating at 60° C. for 16 hours in an inert atmosphere of nitrogen.

Example 9

The procedure of Example 3 is repeated replacing the N-methoxymethyl-α-chloroacetamide with a molar equivalent of α-chloroacetamide itself. The product is a polymer comprising units of Formula XVI:

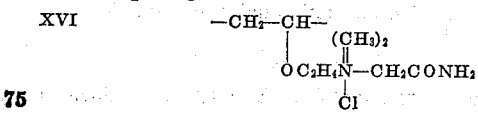

Example 10

The procedure of Example 9 is repeated replacing the α-chloroacetamide with a molar equivalent of α-chloroacetylurea. The product is a polymer of units of Formula XVII:

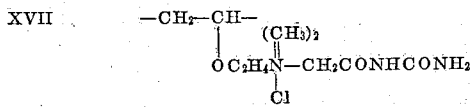

Example 11

(a) There is charged into a reaction vessel 2,090 grams of a 53.5% solution in toluene of methyl polyacrylate (13 moles) (mol weight of 15,000 to 25,000), having a Gardner-Holdt viscosity of $Z_4+$ (75 poises) as a 50% solution in toluene at 25° C. Then 500 grams of toluene is removed by stirring and heating (steam bath) the solution at reduced pressure (30 to 50 mm.). To the viscous, colorless polymer solution that remains, there is added 755 grams of dimethylaminopropylamine (7½ moles) and 200 ml. of butanol, and the mixture is heated with stirring until homogeneous. A solution of 200 grams of a 25% solution of sodium methoxide in methanol (5% methoxide on polyacrylate) is diluted with 200 ml. of butanol and added dropwise to the hot solution. This addition is performed slowly to avoid gelation of the polymer. The final mixture is heated to reflux for 16 hours. The copolymer in the resulting solution contained 43% of methyl acrylate units and 57% of N-(3-dimethylaminopropyl)-acrylamide units.

(b) The copolymer solution obtained in part (a) is diluted with 15 liters of absolute ethanol and stirred at 80° C. until it is homogeneous. At this temperature, 7.5 gram moles of N-(β-chloroethyl)-N,N′-ethyleneurea is added slowly. The resulting solution is heated to 80° to 85° C. for about 12 hours. The quaternary compound isolated by evaporating the solvent, slurrying the solid residue with petroleum ether, and drying is a water-soluble light tan solid comprising methyl acrylate units and units of the Formula XVIII:

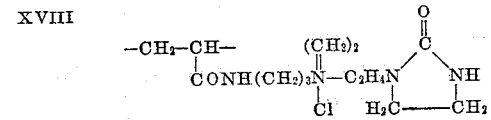

Example 12

The addition to separate aqueous 10% suspensions of clay having a pH of 2.5 of 0.2% by weight (on the weight of clay) of the polymers of Example 1(b), Example 2, Example 5(b), and Example 8, served to flocculate the clay so that filtration of the suspensions is hastened. Similar improvement in filtration is obtained when the same proportion of these polymers is added to suspensions obtained by the acid leaching of pulverized gold ores.

Example 13

(a) The procedure of Example 3 is repeated replacing the vinyl ether with a molarly equivalent amount of poly-(N-[3-dimethylaminopropyl]acrylamide). The polymer obtained comprised units having the structure of Formula XIX:

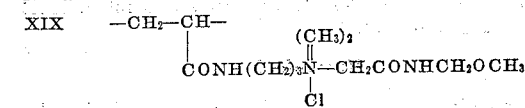

(b) The polymer of part (a) is applied to nylon, cellulose acetate, polyethylene terephthalate (Dacron) and polyacrylonitrile fabrics (Orlon) by the procedure of Example 4. Effective antistatic quality of durable character is obtained.

Example 14

The copolymers of Examples 9 and 10 when added to suspensions of 20% carbon black in water in an amount of 0.3% on the weight of carbon black give uniform, stable dispersions.

It is to be understood that changes and variations may be made without departing from the spirit and scope of the invention as defined in the appended claims.

We claim:

1. A monomeric compound having the formula

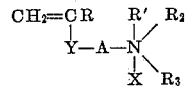

where:

R is selected from the group consisting of hydrogen and methyl,

Y is selected from the group consisting of O, —CONR—, and —COO—,

A is selected from the group consisting of straight-chain and branched-chain alkylene groups having 2 to 10 carbon atoms and such alkylene groups substituted by at least one hydroxyl group, at least two of the carbon atoms of A being connected in a chain between the N atom and Y group of the formula, R′ and R² are selected from the group consisting of (1) separate groups selected individually from the group consisting of saturated and ethylenically unsaturated hydrocarbon groups of 1 to 4 carbon atoms, and (2) a composite group which together with the adjoining N atoms form a heterocyclic nucleus selected from the group consisting of the morpholino residue, the pyrrolidino residue, the piperidino residue, and an N-alkyl piperazino residue of the formula: $(C_2H_4)_2{:}NR^4$ where $R^4$ is an alkyl group of 1 to 18 carbon atoms, X is a halogen atom, and R³ is a radical selected from the group consisting of those having the Formulas II and III following:

II 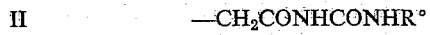

III 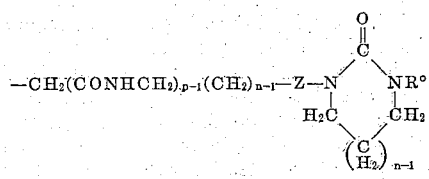

wherein:

R° is selected from the group consisting of H, —CH₂OH, and —CH₂OR⁵ where R⁵ is an alkyl group having from 1 to 4 carbon atoms, p is an integer having a value of 1 to 2, n is an integer having a value of 1 to 2 when p is 2 but having only a value of 1 when p is 1, and Z is selected from the group consisting of

and —CH₂— when p is 1, but is only CH₂ when p is 2.

2. A polymer of monoethylenically unsaturated monomers comprising at least 5 mole percent of at least one monomer as defined in claim 1.

3. A polymer of monoethylenically unsaturated monomers comprising at least 5 mole percent of at least one monomer as defined in claim 1, said polymer comprising at least 30 mole percent of units containing quaternary ammonium nitrogen.

4. A polymer of monoethylenically unsaturated monomers comprising at least 30 mole percent of at least one monomer as defined in claim 1.

5. A polymer of monoethylenically unsaturated monomers comprising at least 5 mole percent of a monomer having the formula

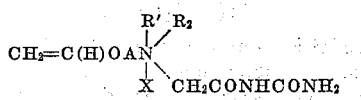

where:

A is an alklene group having 2 to 10 carbon atoms, at least two of the carbon atoms thereof being connected in a chain between the N and O atoms, R' is a saturated hydrocarbon group of 1 to 4 carbon atoms, $R^2$ is a saturated hydrocarbon group of 1 to 4 carbon atoms, and X is a halogen atom.

6. A polymer of monoethylenically unsaturated monomers comprising at least 5 mole percent of a monomer having the formula

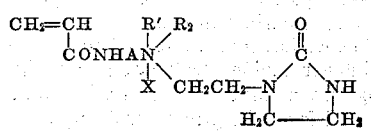

where:

A is an alkylene group having 2 to 10 carbon atoms, at least two of the carbon atoms thereof being connected in a chain between the nitrogen atoms, R' is a saturated hydrocarbon group of 1 to 4 carbon atoms, $R^2$ is a saturated hydrocarbon group of 1 to 4 carbon atoms, and X is a halogen atom.

7. A polymer of monoethylenically unsaturated monomers comprising at least 5 mole percent of a monomer having the formula

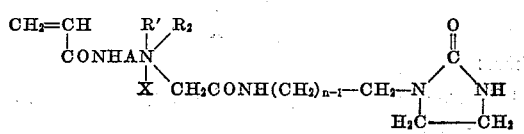

where:

A is an alkylene group having 2 to 10 carbon atoms, at least two of the carbon atoms thereof being connected in a chain between the nitrogen atoms, R' is a saturated hydrocarbon group of 1 to 4 carbon atoms, $R^2$ is a saturated hydrocarbon group of 1 to 4 carbon atoms, X is a halogen atom, and n is an integer having a value of 1 to 2.

8. A polymer containing units having the formula

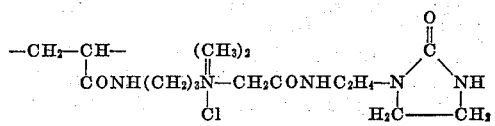

9. A polymer containing units having the formula

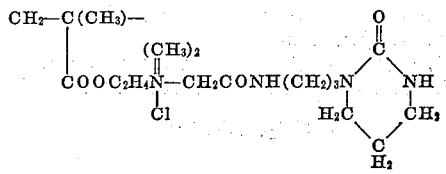

10. A polymer containing units having the formula

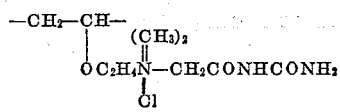

11. A polymer containing units having the formula

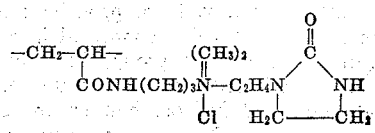

12. A method which comprises reacting, at a temperature of about 60° to 100° C., a tertiary amine having the formula $CH_2=C(R)YANR^7R^8$ with a quaternizing agent having the formula $R^3X$ to produce a monomer, and polymerizing the last-mentioned monomer at a temperature of about 60° to 100° C., the symbols of the formula being defined as follows:

R is selected from the group consisting of hydrogen and methyl,

Y is selected from the group consisting of O, —CONR—, and —COO—,

A is selected from the group consisting of straight-chain and branched-chain alkylene groups having 2 to 10 carbon atoms and such alkylene groups substituted by at least one hydroxyl group, at least two of the carbon atoms of A being connected in a chain between the N atom and Y group of the formula, $R^7$ and $R^8$ are selected from the group consisting of separate saturated hydrocarbon groups of 1 to 4 carbon atoms, and (2) a composite group which together and with the adjoining N atoms form a heterocyclic nucleus selected from the group consisting of the morpholino residue, the pyrrolidino residue, the piperidino residue, and an N-alkyl piperazino residue of the formula :$(C_2H_4)_2$:$NR^4$ where $R^4$ is an alkyl group of 1 to 18 carbon atoms, X is a halogen atom, and $R^3$ is a radical selected from the group consisting of those having the Formulas II and III following:

II    —$CH_2CONHCONHR°$

III

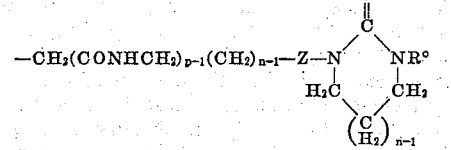

wherein:

R° is selected from the group consisting of H, —$CH_2OH$, and —$CH_2OR^5$ where $R^5$ is an alkyl group having from 1 to 4 carbon atoms, p is in integer having a value of 1 to 2, n is an integer having a value of 1 to 2 when p is 2 but having only a value of 1 when p is 1, and Z is selected from the group consisting of

and —$CH_2$— when p is 1, but is only $CH_2$ when p is 2.

13. A method which comprises quaternizing a polymer of a tertiary amine having the formula $CH_2=C(R)YANR^7R^8$ at a temperature of about 60° to 100° C. until at least 5 mole percent of tertiary amine containing units of the polymer derived from the amine of the aforesaid formula have been quaternized with a compound having the formula $R^3X$, the symbols of the formulas being defined at follows:

R is selected from the group consisting of hydrogen and methyl,

Y is selected from the group consisting of O, —CONR—, and —COO—,

A is selected from the group consisting of straight-chain and branched-chain alkylene groups having 2 to 10 carbon atoms and such alkylene groups substituted by at least one hydroxyl group, at least two of the carbon atoms of A being connected in a chain between the N atom and Y group of the formula, $R^7$ and $R^8$ are selected from the group consisting of separate saturated hydrocarbon groups of 1 to 4 carbon atoms, and (2) a composite group which together and with the adjoining N atoms form a heterocyclic nucleus selected from the group consisting of the morpholino residue, the pyrrolidino residue, the piperidino residue, and an N-alkyl piperazino residue of the formula $:(C_2H_4)_2:NR^4$ where $R^4$ is an alkyl group of 1 to 18 carbon atoms, X is a halogen atom, and $R^3$ is a radical selected from the group consisting of those having the Formulas II and III following:

II 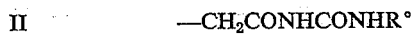

III
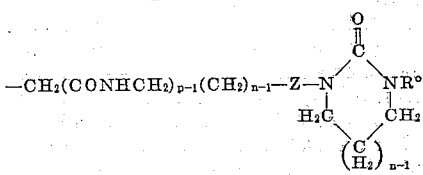

wherein:

$R°$ is selected from the group consisting of H, $-CH_2OH$, and $-CH_2OR^5$ where $R^5$ is an alkyl group having from 1 to 4 carbon atoms, p is an integer having a value of 1 to 2, n is an integer having a value of 1 to 2 when p is 2 but having only a value of 1 when p is 1, and Z is selected from the group consisting of

and $-CH_2-$ when p is 1, but is only $CH_2$ when p is 2.

14. A method as defined in claim 13 which comprises the additional step of quaternizing, at a temperature of about 60° to 100° C., additional tertiary nitrogen containing units of the polymer with a compound of the formula $R^6X$ as defined hereinafter, the amount of $R^3X$ and $R^6X$ being sufficient to produce at least 30 mole percent of quaternized units in the polymer, X being a halogen atom as before, and $R^6$ being selected from the group consisting of benzyl, cyclohexyl, and alkyl groups having 1 to 4 carbon atoms.

15. A method which comprises impregnating a textile material with an aqueous dispersion of a water-soluble polymer of monoethylenically unsaturated monomers comprising at least 5 mole percent of at least one monomer having the formula I

where:

R is selected from the group consisting of hydrogen and methyl,

Y is selected from the group consisting of O, $-CONR-$, and $-COO-$,

A is selected from the group consisting of straight-chain and branched-chain alkylene groups having 2 to 10 carbon atoms and such alkylene groups substituted by at least one hydroxyl group, at least two of the carbon atoms of A being connected in a chain between the N atom and Y group of the formula, $R'$ and $R^2$ are selected from the group consisting of (1) separate groups selected individually from the group consisting of saturated and ethylenically unsaturated hydrocarbon groups of 1 to 4 carbon atoms, and (2) a composite group which together and with the adjoining N atoms form a heterocyclic nucleus selected from the group consisting of the morpholino residue, the pyrrolidino residue, the piperidino residue, and an N-alkyl piperazino residue of the formula $:(C_2H_4)_2:NR^4$ where $R^4$ is an alkyl group of 1 to 18 carbon atoms, X is a halogen atom, and $R^3$ is a radical selected from the group consisting of those having the Formulas II and II following:

II 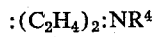

III
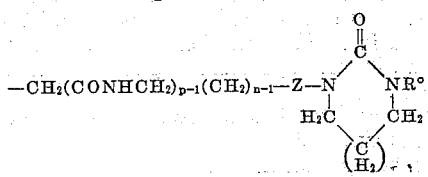

wherein:

$R°$ is selected from the group consisting of $-CH_2OH$, and $-CH_2OR^5$ where $R^5$ is an alkyl group having from 1 to 4 carbon atoms, p is an integer having a value of 1 to 2, n is an integer having a value of 1 to 2 when p is 2 but having only a value of 1 when p is 1, and Z is selected from the group consisting of

and $-CH_2-$ when p is 1, but is only $CH_2$ when p is 2, and drying and heating the impregnated material at a temperature of 240° F. to 450° F.

16. A method which comprises impregnating a textile material with an aqueous dispersion of a water-soluble polymer of monoethylenically unsaturated monomers comprising at least 5 mole percent of at least one monomer having the formula I
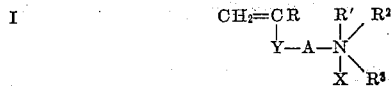

where:

R is selected from the group consisting of hydrogen and methyl,

Y is selected from the group consisting of O, $-CONR-$, and $-COO-$,

A is selected from the group consisting of straight-chain and branched-chain alkylene groups having 2 to 10 carbon atoms and such alkylene groups substituted by at least one hydroxyl group, at least two of the carbon atoms of A being connected in a chain between the N atom and Y group of the formula, $R'$ and $R^2$ are selected from the group consisting of (1) separate groups selected individually from the group consisting of saturated and ethylenically unsaturated hydrocarbon groups of 1 to 4 carbon atoms, and (2) a composite group which together and with the adjoining N atoms form a heterocyclic nucleus selected from the group consisting of the morpholino residue, the pyrrolidino residue, the piperidino residue, and an N-alkyl piperazino residue of the formula $:(C_2H_4)_2:NR^4$ where $R^4$ is an alkyl group of 1 to 18 carbon atoms, X is a halogen atom, and $R^3$ is a radical selected from the group consisting of those having the Formulas II and III followings:

II 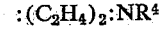

III
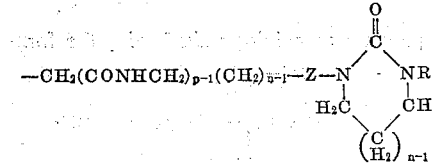

wherein:

R° is selected from the group consisting of —$CH_2OH$, and —$CH_2OR^5$ where $R^5$ is an alkyl group having from 1 to 4 carbon atoms, $p$ is an integer having a value of 1 to 2, $n$ is an integer having a value of 1 to 2 when $p$ is 2 but having only a value of 1 when $p$ is 1, and Z is selected from the group consisting of $$-\overset{O}{\underset{\|}{C}}-$$

and —$CH_2$— when $p$ is 1, but is only $CH_2$ when $p$ is 2, said polymer comprising at least 30 mole percent of units containing quaternary ammonium nitrogen, and drying and heating the impregnated material at a temperature of 240° F. to 450° F.

References Cited in the file of this patent

UNITED STATES PATENTS

| | | |
|---|---|---|
| 2,256,186 | Balle et al. | Sept. 16, 1941 |
| 2,517,750 | Wilson | Aug. 8, 1950 |
| 2,526,757 | Larson et al. | Oct. 24, 1950 |
| 2,628,224 | Cairns et al. | Feb. 10, 1953 |
| 2,694,695 | Bortnick | Nov. 6, 1954 |
| 2,741,568 | Hayek | Apr. 10, 1956 |
| 2,744,130 | Winberg | May 1, 1956 |
| 2,764,578 | Barney | Sept. 25, 1956 |

OTHER REFERENCES

Pearl et al.: "Jour. of The American Chem. Society," vol. 61, pp. 1377–1378, June 1939.